(12) United States Patent
Jian et al.

(10) Patent No.: US 7,778,325 B2
(45) Date of Patent: Aug. 17, 2010

(54) OPTICAL DRIVE CONTROLLER CHIP CAPABLE OF SENDING COMMAND MESSAGES IN ADVANCE AND TRANSMISSION METHOD THEREOF

(76) Inventors: Nick Jian, 8F, No. 535, Chung-Cheng Rd., Hsin-Tien City, Taipei Hsien (TW); James Chen, 8F, No. 535, Chung-Cheng Rd., Hsin-Tien City, Taipei Hsien (TW)

( * ) Notice: Subject to any disclaimer, the term of this patent is extended or adjusted under 35 U.S.C. 154(b) by 1142 days.

(21) Appl. No.: 11/015,923

(22) Filed: Dec. 17, 2004

(65) Prior Publication Data

US 2005/0185717 A1   Aug. 25, 2005

(30) Foreign Application Priority Data

Feb. 25, 2004   (TW) .............................. 93104824 A

(51) Int. Cl.
*H04N 7/12*   (2006.01)
(52) U.S. Cl. ...................... 375/240; 369/54; 369/275.1; 386/126; 386/95
(58) Field of Classification Search ............ 375/240.25; 369/685, 275.1
See application file for complete search history.

(56) References Cited

U.S. PATENT DOCUMENTS

| | | | | |
|---|---|---|---|---|
| 5,654,949 A | * | 8/1997 | Nonaka et al. ........... | 369/47.33 |
| 5,991,251 A | * | 11/1999 | Sakurai et al. ............. | 369/53.2 |
| 6,418,099 B2 | * | 7/2002 | Yamamoto ................ | 369/47.11 |
| 6,466,736 B1 | * | 10/2002 | Chen et al. .................. | 386/126 |
| 7,190,880 B2 | * | 3/2007 | Cookson et al. ............... | 386/95 |
| 7,327,934 B2 | * | 2/2008 | Kitani .......................... | 386/94 |

FOREIGN PATENT DOCUMENTS

| | | | |
|---|---|---|---|
| CN | 1560845 |   | 1/2005 |
| EP | 763944 | * | 3/1997 |
| EP | 1071255 | * | 1/2001 |
| TW | 261195 |   | 9/2006 |

* cited by examiner

*Primary Examiner*—Tung Vo
*Assistant Examiner*—Anner Holder
(74) *Attorney, Agent, or Firm*—Perkins Coie LLP

(57) ABSTRACT

An optical drive control chip capable of sending command messages in advance and the transmission method of the optical drive control chip are described. The method includes at least the following steps. First, a MPEG module sends a command message to a decoder module. After receiving the command message, the decoder module reads an amount of data and stores it in a memory, so that the data is accessible to the MPEG module. After the data is stored in the memory, the decoder module sends an acknowledgement message to the MPEG module. Without receiving the acknowledgement message, the MPEG module directly sends the next command message to the decoder module. The MPEG module reads the data stored in the memory.

19 Claims, 3 Drawing Sheets

OPTICAL DRIVE CONTROLLER CHIP CAPABLE OF SENDING COMMAND MESSAGES IN ADVANCE AND TRANSMISSION METHOD THEREOF

RELATED APPLICATIONS

The present application is based on, and claims priority from, Taiwan Application Serial Number 93104824, filed on Feb. 25, 2004, the disclosure of which is hereby incorporated by reference herein in its entirety.

BACKGROUND

1. Field of Invention

The present invention relates to an optical drive controller chip and a method for the optical drive controller chip to send a command message in advance. More particularly, the present invention relates to an optical drive controller chip for sending a plurality of command messages to a decoder module and the transmission method thereof.

2. Description of Related Art

In the field of video compression, the MPEG standard is one of the most popular standards. In the MPEG standard, the MPEG 2 standard can provide high quality video, and therefore, it is the most popular video standard in the market. The data involved in video compatible with MPEG 2 standard is huge, so a high capacity storage medium is needed, such as a DVD.

In the process of playing a DVD, the control of a servo motor is needed to move the laser pick-up to the right position. Thus, the right data can be read from the DVD. Moreover, the data read from the DVD has to be quickly and efficiently decoded according to the MPEG 2 standard, so that the MPEG 2 video is played smoothly without blocking or delayed effect.

The calculation for decoding an MPEG 2 video is very complex. If the decoding process is performed by software, blocking and delays may happen because of the speed limits of the central processing unit. If the decoding process is performed by hardware, the MPEG 2 decoding, the DVD decoding, and the control of the servo motor must cooperate very well. Therefore, how to design a hardware for driving a servo motor, decoding the content in the optical disk, performing the MPEG 2 decoding, and utilizing the advantages of SOC (system on chip) to play a DVD very fluently is in great need.

FIG. 1 is a block diagram illustrating an optical drive control circuit. With reference to FIG. 1, the optical drive control circuit 100 includes a first central processing unit 102, a second central processing unit 104, an MPEG module 106, and a decoder module 108. The decoder module 108 includes a servo controller 110. The servo controller 110 controls a servo motor (not shown). The servo motor drives the optical disk, so that the laser pick-up is able to read the right data from the right position on the optical disk. The optical disk is, for example, a DVD. The second central processing unit 104 controls the decoder 108.

The MPEG module 106 obtains the data read from the optical disk and decodes the data according to an MPEG standard. The MPEG standard is, for example, a MPEG 2 standard. The first central processing unit 102 controls the MPEG module 106. There is an IDE (Integrated Drive Electronics) interface 114 between the MPEG module 106 and the decoder module 108. Therefore, communication between the MPEG module 106 and the decoder module 108 must be via the IDE interface 114.

FIG. 3 is a diagram illustrating an ATAPI command sequence in accordance with the block diagram shown in FIG. 1. With reference to FIG. 3, the MPEG module 106 sends an ATAPI command message 304 to the decoder module 108 via the ATAPI interface 302. The ATAPI interface 302 is a type of IDE interface 114 shown in FIG. 1. After receiving the ATAPI command message 304, the decoder module 108 controls the laser pick-up to read data from the optical disk and stores the data in a memory 112 (as shown in FIG. 1). After the data is stored in the memory 112, the decoder module 108 sends an acknowledgement message 306 via the ATAPI interface 302. The acknowledgement message 306 is converted into an ATA ISR signal 308 to inform the MPEG module 106.

Next, the decoder module 108 updates the device, prepares data, and sends an update device signal 310 to the ATAPI interface 302. Before sending next ATAPI command message 312, the MPEG module 106 sends a read device status signal 314 to make sure that the decoder module 108 is ready for receiving the ATAPI command message 312. Next, the MPEG module 106 sends the ATAPI command message 312. Next, the MPEG module 106 and the decoder module 108 repeat the same handshaking procedure and read the data on the optical disk and perform MPEG 2 decoding.

As mentioned above, in FIG. 3, the handshaking between the MPEG module 106 and the decoder module 108 must be transmitted via the ATAPI interface 302. Not until the MPEG module 106 makes sure that the acknowledgement message 306 sent from the decoder module 108 is received does the MPEG module 106 send next ATAPI command message 312. After receiving the ATAPI command message 304 or 312, the decoder module 108 controls the servo motor to move the laser pick-up to the right position so that the right data can be read. If the allocation of data recorded on the optical disk is discontinuous, it may take a long time for the laser pick-up to move to the right position. The time spent in moving the pick-up to the right position is longer than the time spent in decoding the data read from the optical disk (such as data error detection or data recovery). When the moving speed of the laser pick-up is not fast enough, the MPEG module 106 may not be able to get the data on time, so that the decoded video is blocked or delayed.

SUMMARY

A method for an optical drive controller chip to send a command message in advance is described. The method includes the following steps. First, a command message is sent from a MPEG module to a decoder module. Next, after the decoder module receives the command message, data on an optical disk is read and stored in a memory, so that the data is accessible to the MPEG module. Next, after the data is stored in the memory, the decoder module sends an acknowledgement message to the MPEG module. Next, without receiving the acknowledgement message, the MPEG module directly sends next command message to the decoder module according to a predetermined rate. Next, the MPEG module accesses the data stored in the memory to perform a decoding process according to an MPEG standard and displays the decoded video.

An optical drive control circuit is also described. The optical drive control circuit includes at least one decoder module, one MPEG module, and a central processing unit.

The decoder module receives a plurality of command messages. After the decoder module receives a command message, the decoder module reads data and stores the data in a memory. When the data is stored in the memory, the decoder module sends an acknowledgement message.

Without receiving the acknowledgement message, the MPEG module directly sends the command messages. The MPEG module accesses the data stored in the memory. The central processing unit controls and coordinates the decoder module and the MPEG module.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
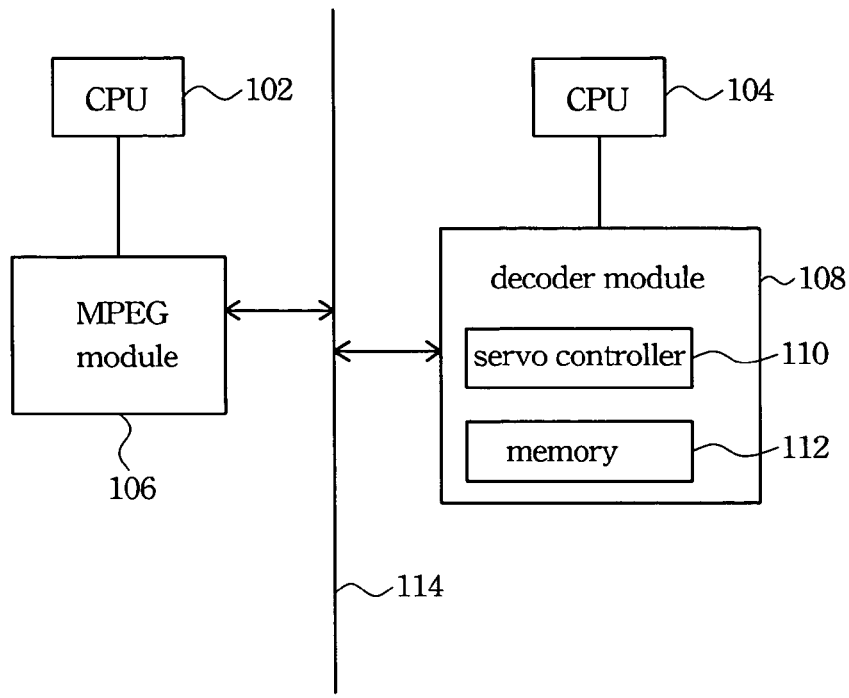
FIG. 1 is a block diagram illustrating an optical drive control circuit.

Reference will now be made in detail to the present preferred embodiments of the invention, examples of which are illustrated in the accompanying drawings. Wherever possible, the same reference numbers are used in the drawings and the description to refer to the same or like parts.

Figure 2:
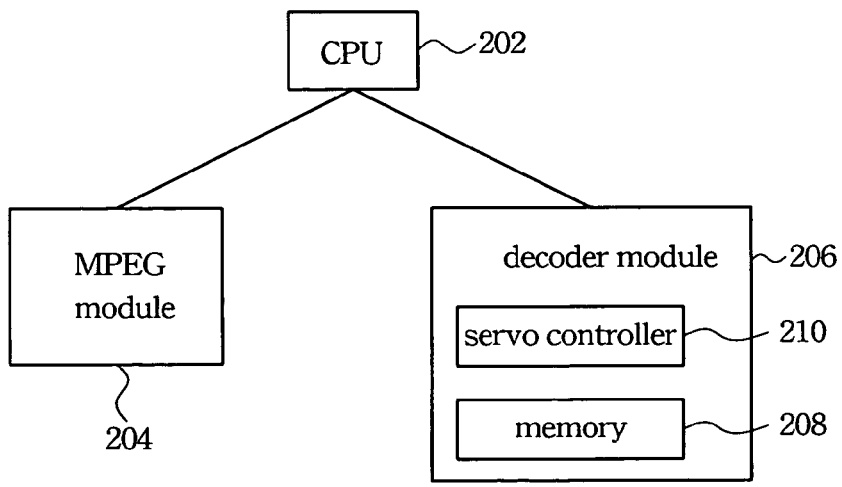
FIG. 2 is a block diagram illustrating a preferred embodiment of the optical drive control circuit according to the present invention.

FIG. 2 is a block diagram illustrating a preferred embodiment of the optical drive control circuit according to the present invention. With reference to FIG. 2, an optical drive control circuit 200 includes a central processing unit 202, an MPEG module 204, and a decoder module 206. The decoder module 206 includes a memory 208 and a servo controller 210. The servo controller 210 controls a servo motor (not shown) and the servo motor controls the laser pick-up to access the data stored in an optical disk at a right position. Compared to the optical drive control circuit 100 shown in FIG. 1, the optical drive control circuit 200 doesn't need the IDE interface 114. Additionally, the optical drive control circuit 200 needs only one central processing unit 202. The optical drive control circuit 100 needs two central processing units (102 and 104).

Figure 4:
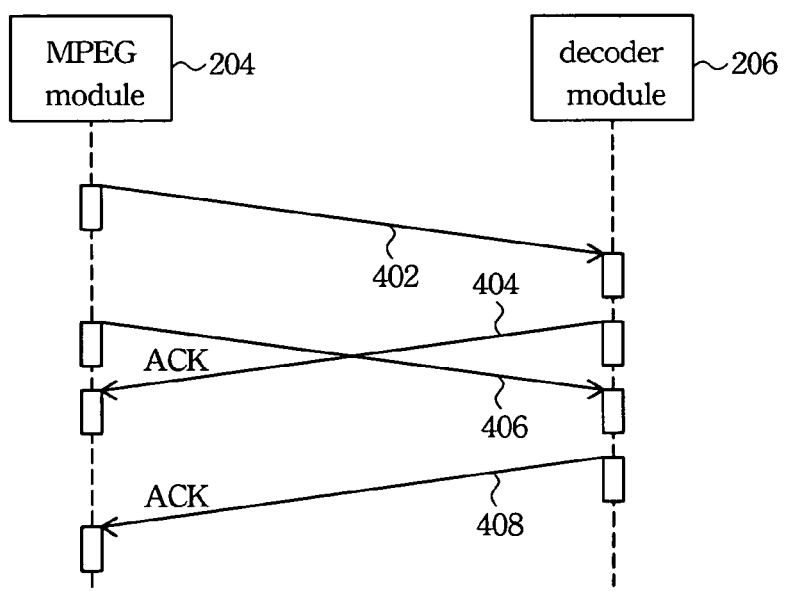
FIG. 4 is a diagram illustrating an ATAPI command sequence in accordance with the block diagram shown in FIG. 2.

FIG. 4 is a diagram illustrating an ATAPI command sequence in accordance with the block diagram shown in FIG. 2. FIG. 4 also depicts a preferred embodiment of the method for an optical drive controller chip to send a command message in advance. With reference to FIG. 4 and FIG. 2, first, the MPEG module 204 determines the rate of sending a plurality of ATAPI command messages to the decoder module 206. Next, the MPEG module 204 sends an ATAPI command message 402 to the decoder module 206. The decoder module 206 receives the ATAPI command message 402 and then controls the laser pick-up to read data from the optical disk (such as a DVD). The data read from the optical disk is stored in the memory 208 and is accessible to the MPEG module 204.

After the data is stored in the memory 208, the decoder module 206 sends an acknowledgement message 404 to the MPEG module 204. When the MPEG module 204 has not yet received the acknowledgement message 404, the MPEG module 204 is in an unacknowledged status.

In the unacknowledged status, the MPEG module 204 directly sends an ATAPI command message 406 to the decoder module 206 at the rate mentioned above. That is to say, without waiting to receive the acknowledgement message 404, the MPEG module 204 decides by itself to send the ATAPI command message 406. In contrast to the command sequence shown in FIG. 3, the command sequence shown in FIG. 4 doesn't need the ATAPI interface 302. Therefore, the MPEG module 204 doesn't have to wait to receive the acknowledgement message 404 and decides by itself to send the ATAPI command message 406. After the decoder module 206 receives the ATAPI command message 406, the decoder module 206 reads next data from the optical disk and stores the data in the memory 208. The data stored in the memory 208 is accessible to the MPEG module 204. After the data is stored in the memory 208, the decoder module 206 sends an acknowledgement message 408 to the MPEG module 204. The MPEG module 204 accesses the data stored in the memory 208 and decodes the data according to an MPEG standard for display. The MPEG standard is, for example, an MPEG 2 standard.

Because the time the ATAPI command message 406 is sent is earlier than the time the MPEG module 204 receives the acknowledgement message 404, the decoder module 206 is able to receive the ATAPI command message 406 earlier. Therefore, the decoder module 206 is capable of moving the laser pick-up to the right position earlier. The time for the decoder module 206 to wait for the ATAPI command message 406 is saved. Therefore, the image is not blocked or delayed.

The way of determining the rate of sending the ATAPI command messages to the decoder module 206 is described in the following example. The MPEG module 204 calculates the capacity of the memory 208 in advance, cooperates with the speed of the laser pick-up to move to the right position, and further cooperates with the frequency of the access that the MPEG module 204 itself makes to read the data stored in the memory 208. Thus, the rate of sending the ATAPI command messages is obtained. The decoder module 206 is able to inform the pick-up to move to the right position in advance and the data is also stored in the memory 208 in advance. The process of storing the data in the memory 208 in advance is called pre-fetch.

In FIG. 2, the central processing unit 202 is used to control and coordinate the MPEG module 204 and the decoder module 206. In FIG. 1, the first central processing unit 102 and the second central processing unit 104 control the MPEG module 106 and the decoder module 108, respectively. The communication between the first central processing unit 102 and the second central processing unit 104 is via the IDE interface 114. Therefore, the structure shown in FIG. 2 can control the MPEG module 204 and the decoder module 206 more efficiently.

Figure 5:
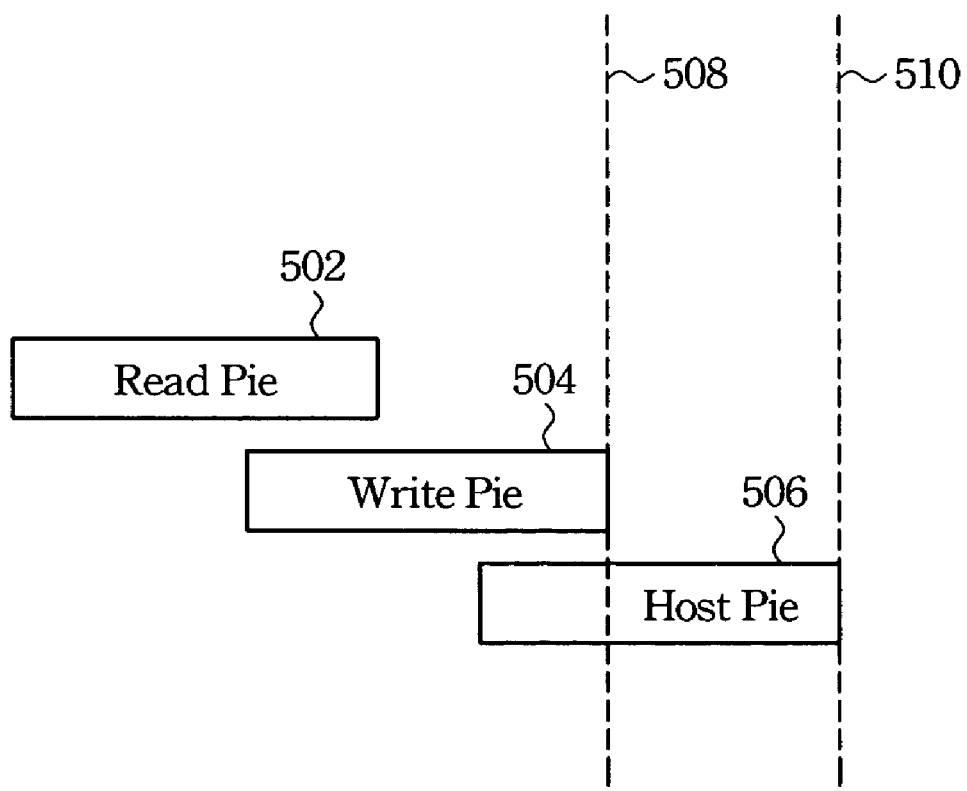
FIG. 5 is a diagram illustrating an example of the operation time sequence of the decoder module.

FIG. 5 is a diagram illustrating an example of the operation time sequence of the decoder module (such as 108 or 206). With reference to FIG. 5, the process of reading data from the optical disk by the decoder module 206 includes reading pie 502, writing pie 504, and hosting pie 506. Reading pie 502 represents that the laser pick-up is searching for the right position on the optical disk and reads the data from the optical disk. Writing pie 504 represents that the decoding process of the data is finished. Hosting pie 506 represents the transmission process of the decoded data.

Figure 3:
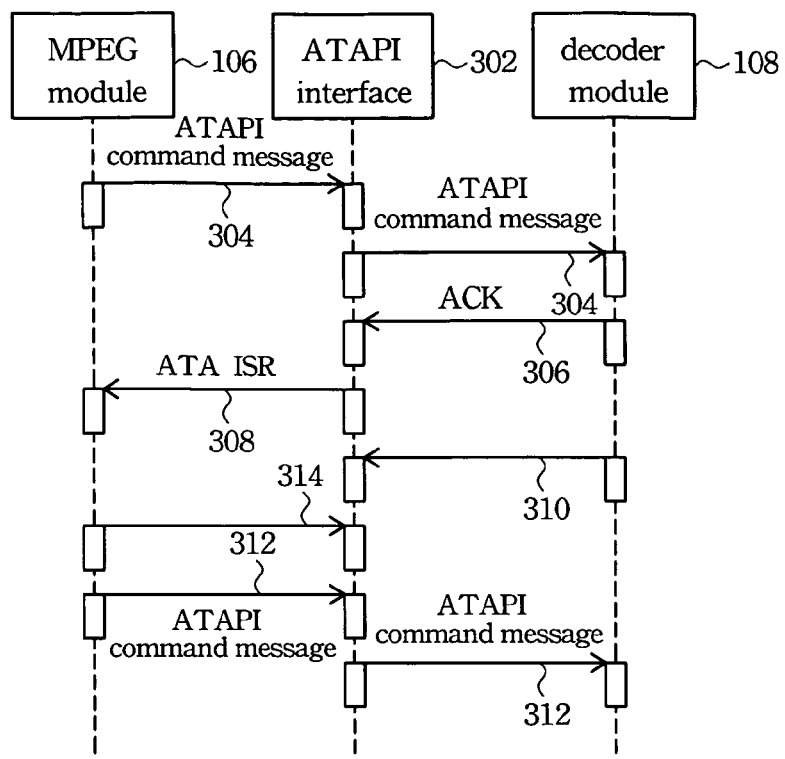
FIG. 3 is a diagram illustrating an ATAPI command sequence in accordance with the block diagram shown in FIG. 1.

In the command sequence shown in FIG. 3, the decoder module 108 performs the next step of reading pie 502 until the step of hosting pie 506 is finished (time 510). In the command sequence shown in FIG. 4, for example, because the decoder module 206 receives the ATAPI command message 406 in advance, when the step of writing pie 504 is finished and the step of hosting pie 506 is still in progress, the decoder module 206 is allowed to start the step of reading pie 502 at time 508. Therefore, the time from 508 to 510 is saved to perform the process of pre-fetch.

Although the present invention has been described in considerable detail with reference to certain preferred embodiments thereof, other embodiments are possible. Therefore, their spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method, comprising:
   sending a first command message in an optical drive controller chip from an MPEG module to a decoder module of the optical drive controller chip, the first command message causing the decoder module (a) to read data and store the read data in a memory accessible to the MPEG module, and (b) to send an acknowledgement message to the MPEG module; and
   sending a second command message from the MPEG module subsequent to receiving the acknowledgment message from the decoder module;
   if the acknowledgement message is not received within a specified time duration, automatically sending the second command message from the MPEG module to the decoder module subsequent to a specified time delay, wherein the specified time delay is based on a predetermined rate of transmitting messages to the decoder module; and
   accessing the data stored in the memory by the MPEG module; and
   decoding the data, according to an MPEG standard, by the MPEG module.

2. The method of claim 1, further comprising causing a servo controller included in the decoder module and configured to control a servo motor to cause a laser pick-up to access data stored in an optical disk.

3. The method of claim 1, further comprising:
   receiving commands for controlling and coordinating the MPEG module from a central processing unit.

4. An optical drive control circuit, comprising:
   a decoder module configured (a) to receive a first command message, (b) to read data and store the data in a memory after receiving the first command message, and (c) to send an acknowledgement message upon storing the data in the memory;
   an MPEG module configured (a) to send a second command message to the decoder module subsequent to receiving the acknowledgment message and (b) to send the second command message subsequent to a specified time delay if the decoder module does not send the acknowledgment message within a specified time duration, wherein the specified time delay is based on a predetermined rate of transmitting messages to the decoder module, wherein the MPEG module is configured to access the data stored in the memory and to decode the data according to an MPEG standard; and
   a central processing unit configured to control and coordinate both the decoder module and the MPEG module.

5. The optical drive control circuit of claim 4, wherein the decoder module comprises a servo controller configured to control a servo motor and the servo motor is configured to control a laser pick-up to access the data stored in the optical disk.

6. The optical drive control circuit of claim 4, wherein the optical drive control circuit is a single chip.

7. An optical drive control circuit, comprising:
   a first means for receiving a first command message, wherein after the first means receives the first command message, the first means reads data and stores the data in a memory, and if the data is stored in the memory, the first means sends an acknowledgement message; and
   a second means for sending a second command message to the first means after receiving the acknowledgment message, wherein the second means automatically sends the second command message subsequent to a specified time delay if the first means does not send the acknowledgment message within a specified time duration, wherein the specified time delay is based on a predetermined rate of transmitting messages to the first means, and wherein the second means accesses the data stored in the memory and decodes the data according to an MPEG standard.

8. The optical drive control circuit of claim 7, wherein the first means comprises a servo controller for controlling a servo motor and the servo motor controls a laser pick-up to access the data stored in an optical disk.

9. The optical drive control circuit of claim 7, wherein the optical drive control circuit is a single chip.

10. A method performed by a component that is configured to decode video data to communicate with a module that is configured to command an optical disk servo controller to read and decode data stored on an optical disk, the component and module controlled by a common processor, the method comprising:
    calculating a rate at which commands can be sent to the module, wherein the rate is calculated based on a capacity of a memory accessible by the module, a speed of a pickup head communicably coupled to the optical disk servo controller, and a frequency at which the component accesses the memory;
    sending a first command to the module;
    sending a second command message to the module after receiving an acknowledgment message from the module in response to the first command, and if the acknowledgment message is not received within a specific time duration, automatically sending the second command message to the module subsequent to a specified time delay, wherein the specified time delay is based on calculated rate;
    accessing video data stored in memory by the module in response to at least one of the sent commands; and
    decoding the video data stored in the memory.

11. The method of claim 10, further comprising causing the module to move a laser pick-up to a correct position in advance of sending a command to read data at the correct position.

12. The method of claim 10 wherein the commands are ATAPI command messages.

13. The method of claim 1, wherein the he specific time duration is determined based on the calculated rate.

14. The method of claim 13, wherein the calculated rate is calculated based on a capacity of the memory, a speed of a pickup head communicably coupled to the decoder module, and a frequency at which the MPEG module accesses the memory.

15. The optical drive control circuit of claim 4, wherein the specific time duration is determined based on the calculated rate.

16. The method of claim 15, wherein the calculated rate is calculated based on a capacity of the memory, a speed of a pickup head communicably coupled to the decoder module, and a frequency at which the MPEG module accesses the memory.

17. The optical drive control circuit of claim 7, wherein the specific time duration is determined based on the calculated rate.

18. The method of claim 17, wherein the calculated rate is calculated based on a capacity of the memory, a speed of a pickup head communicably coupled to the decoder module, and a frequency at which the MPEG module accesses the memory.

19. A method for an optical drive controller chip to send a command message, comprising:
   sending a first command message from an MPEG module to a decoder module, the first command message causing the decoder module (a) to read data and store the read data in a memory accessible to the MPEG module, and (b) to send an acknowledgement message to the MPEG module; and
   sending a second command message from the MPEG module subsequent to receiving the acknowledgment message from the decoder module; and
   if the acknowledgement message is not received within a specified time duration, automatically sending the second command message from the MPEG module to the decoder module subsequent to a specified time delay, wherein the specified time delay is based on a predetermined rate of transmitting messages to the decoder module.

* * * * *

UNITED STATES PATENT AND TRADEMARK OFFICE
CERTIFICATE OF CORRECTION

| | | |
|---|---|---|
| PATENT NO. | : 7,778,325 B2 | Page 1 of 1 |
| APPLICATION NO. | : 11/015923 | |
| DATED | : August 17, 2010 | |
| INVENTOR(S) | : Nick Jian et al. | |

It is certified that error appears in the above-identified patent and that said Letters Patent is hereby corrected as shown below:

In column 6, line 59, in claim 10, after "on" insert -- the --.
    In column 7, line 3, in claim 13, after "the" delete "he".

Signed and Sealed this

Twenty-sixth Day of October, 2010

David J. Kappos
*Director of the United States Patent and Trademark Office*